United States Patent
Liu

(10) Patent No.: US 8,713,952 B2
(45) Date of Patent: *May 6, 2014

(54) OPTIMIZER FOR TWO STAGED REFRIGERATION SYSTEMS

(76) Inventor: Mingsheng Liu, Omaha, NE (US)

( * ) Notice: Subject to any disclaimer, the term of this patent is extended or adjusted under 35 U.S.C. 154(b) by 861 days.

This patent is subject to a terminal disclaimer.

(21) Appl. No.: 12/660,254

(22) Filed: Feb. 24, 2010

(65) Prior Publication Data

US 2011/0208325 A1  Aug. 25, 2011

(51) Int. Cl.
*F25B 1/00* (2006.01)
*G01M 1/38* (2006.01)
*G01R 19/00* (2006.01)

(52) U.S. Cl.
USPC ............... 62/228.4; 62/498; 700/276; 702/64

(58) Field of Classification Search
USPC ......... 62/179, 180, 228.4, 426, 498; 700/276, 700/282, 297; 702/60, 64
See application file for complete search history.

(56) References Cited

U.S. PATENT DOCUMENTS

| | | | |
|---|---|---|---|
| 2008/0073440 A1* | 3/2008 | Butler et al. | 236/91 R |
| 2008/0223051 A1* | 9/2008 | Kates | 62/129 |
| 2009/0133419 A1* | 5/2009 | Matsuno et al. | 62/239 |
| 2009/0255278 A1 | 10/2009 | Taras et al. | |
| 2011/0144811 A1* | 6/2011 | Liu | 700/276 |

FOREIGN PATENT DOCUMENTS

| JP | 57144833 A | * | 9/1982 |
|---|---|---|---|
| JP | 61001942 A | * | 1/1986 |

* cited by examiner

*Primary Examiner* — Chen Wen Jiang

(57) ABSTRACT

An optimizer for modulating the speed of an indoor fan and first and second stage compressors of a two staged refrigeration system with a plurality of relays and an already existing power source. The optimizer is comprised of a speed modulation device, a supply air temperature sensor, and a controller. The speed modulation device is located in proximity to the existing power source and configured to collect current and power related information from the refrigeration system and power source to send to the controller. The supply air temperature sensor is linked to the indoor fan of the two staged refrigeration system and operable to obtain supply air temperature values. The controller is linked in communication with the speed modulation device and supply air temperature sensor and is operable to generate a system mode based on the power, current, and supply air temperature information. Speed commands are then sent to the speed modulation device to modulate the speed.

11 Claims, 2 Drawing Sheets

OPTIMIZER FOR TWO STAGED REFRIGERATION SYSTEMS

CROSS-REFERENCE TO RELATED APPLICATIONS

This application is related to U.S. patent application Ser. No. 12/653,382 entitled "Optimizer for Single Staged Refrigeration Systems".

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

Embodiments are generally related to two staged refrigeration systems, and more particularly to two staged refrigeration systems used in but not limited to residential air conditioning systems, roof top units, residential and commercial air source heat pumps, and water source heat pumps.

2. Discussion of Prior Art

Two staged refrigeration systems are widely used in both residential and commercial buildings. Typical systems maintain single zone room temperatures by staging one or more compressors on and off in two stages. Two staged refrigeration systems operate so that a first group of compressors activate during low load conditions or lower room temperature bias of the set-point. At a high system load, high bias of the room temperature set point, or after the first group of compressors have been active for an extended time period, another group of compressors activate. Compressor groups deactivate in stages when the building load decreases. Typical two staged refrigeration systems are comprised of compressors, a thermostat, a condensing unit, and a supply air fan with ON and AUTO modes of operation. The fan ON mode allows the supply air fan to run continuously regardless of the compressor status. In AUTO mode, the fan status is controlled so that both the compressor and supply air fan turn on and off simultaneously. A circulation fan (also called an indoor fan) supplies air to the conditioned space.

Over the years, engineers have worked to improve two staged refrigeration systems. Particular inventive emphasis has focused on minimizing over-sizing during the equipment selection process. Yet because cooling loads and heating loads vary substantially over the operative spectrum, these measures did not solve the excessive indoor humidity and noise levels, high energy consumption rates, and the high cost of compressor replacements and other necessary repairs often associated with the refrigeration systems.

Further development of the variable capacity compressor resulted in a more energy efficient refrigeration system with greater indoor comfort control. In this system, the compressor could modulate the cooling capacity to within a range of 15 to 100 percent.

The above mentioned development in turn led to the creation of a system comprising both a variable capacity compressor and variable frequency drive. In this new system, the fan speed and compressor capacity could be modulated to maintain the zone temperature set point and discharge air temperatures, respectively. Due to high retrofit costs, however, this system is not implemented in the millions of already existing refrigeration systems. Noise levels are still high under partial load conditions as well. US patent application 20090255278 to Lifson and Taras (2005), proposes a single integrated modulation device that controls a condenser fan, compressor, and indoor fan or, alternatively, three separate modulation devices that each control one of the three previously stated devices (condenser fan, compressor, and indoor fan) at the same speed. Results from lab experiments conducted by the inventor of the proposed application suggests that modulating the condenser fan at the same speed as the compressor and indoor fan will result in a 20+ energy penalty under most operating conditions. The optimizer proposed in the following application also utilizes a single modulation device, however since it controls only the compressor and indoor fan, is more energy efficient than the device proposed by Lifson and Taras.

SUMMARY OF THE INVENTION

The following summary of the invention is provided to facilitate an understanding of some of the innovative features unique to an embodiment of the present invention and is not intended to be a full description. A full appreciation of the various aspects of the invention can be gained by taking the entire specification, claims, drawings, and abstract as a whole.

Accordingly, it is one aspect of an embodiment of the present invention to integrate the modulation and control devices for the indoor fan and compressor into a single, more cost efficient optimizer that can be readily implemented in new and existing two staged refrigeration systems in settings including but not limited to residential air conditioning systems, residential and commercial heat pump systems, water source heat pump systems, and roof top units.

It is another aspect of an embodiment of the present invention to resolve humidity and noise problems in buildings that have single and two staged refrigeration systems currently in use.

It is a further aspect of an embodiment of the present invention to prevent liquid sludge related compressor damage as well as minimize motor failure.

It is yet a further aspect of an embodiment of the present invention to maintain adequate humidity control, thermal comfort levels, maintenance and repairs, and eliminate short cycling in both new and existing refrigeration systems.

In one embodiment, an optimizer for modulating the speed of an indoor fan and first and second stage compressors of a two staged refrigeration system with a plurality of relays and an already existing power source is provided. The optimizer is comprised of a speed modulation device, a supply air temperature sensor, and a controller. The speed modulation device is located in proximity to the existing power source and configured to collect current and power related information from the refrigeration system and power source and send that information to the controller. The supply air temperature sensor is linked to the indoor fan of the two staged refrigeration system and operable to obtain supply air temperature values. The controller is linked in communication with the speed modulation device and supply air temperature sensor. This controller is operable to generate a system mode based on the power and current values and supply air temperature information and send speed commands to the speed modulation device. System modes include heating, cooling, ventilation/cycling, and auxiliary heating modes. Cooling and heating loads are identified based on the fan speed and supply air temperature patterns. The controller sends load information to the speed modulation device to modulate the speed of the indoor fan and first and second stage compressors.

The controller identifies possible faults including (but not limited to) issues involving low charge in the compressor, compressor leakage, dirty coils, and fan belt loss. Since system faults are reported and detected, there is a reduction in compressor and fan failure rates, on and off cycling rates, and O&M costs. Starting the compressor at a low speed maintains a stable motor winding temperature and reduces the inrush current by more than half. Further, motor failure is minimized and liquid sludge related compressor damage prevented. The optimizer applies (but is not limited) to rotary, scroll, screw, and reciprocating compressors. Compressor noise is also reduced under partial load conditions.

Notably, the method and system disclosed herein provides a feasible solution for retrofitting existing systems or those systems that are currently implemented in approximately over 50% of building spaces. However, the optimizer can also be implemented in new systems as well. Due to an energy penalty when moisture is removed from a building, the higher the already existing relative humidity levels, the lower the expected percent energy savings. The optimizer can help reduce peak demand by approximately 30% to 70% depending on the sizing and over-sizing of existing systems. It may also increase system energy by approximately 50%, and reduce energy consumption rates by approximately 20% to 50% according to the seasonal load profile and existing room humidity conditions.

The above-described features and advantages of the present disclosure thus improve upon aspects of those systems and methods in the prior art designed to provide cooling and heating to a single zone using a two staged refrigeration system.

DRAWINGS REFERENCE NUMERALS

101 Power Source
102 Speed Modulation Device
103, 104, 105 Existing Relays
106 First Stage Compressor
107 Second Stage Compressor
108 Indoor Fan
109 Supply Air Temperature Sensor
110 Controller
111, 113, 114, 115, 116 Power Lines
112 Supply Duct Work
201 Mode Identification Module
202 Control Module
203 Fault Detection Module

DESCRIPTION OF THE PREFERRED EMBODIMENT

The particular values and configurations discussed in these non-limiting examples can be varied and are cited merely to illustrate an example of at least one embodiment of the present invention and are not intended to limit the scope of the invention. Also, it is understood that the phraseology and terminology used herein is for the purpose of description and should not be regarded as limiting. The use of "including," "comprising," and variations thereof herein is meant to encompass the items listed thereafter and equivalents thereof as well as additional items. Unless specified or limited otherwise, the terms "mounted," "connected to," "attached to," and variations thereof are used broadly to encompass both direct and indirect mountings, connections, and supports.

Figure 1:
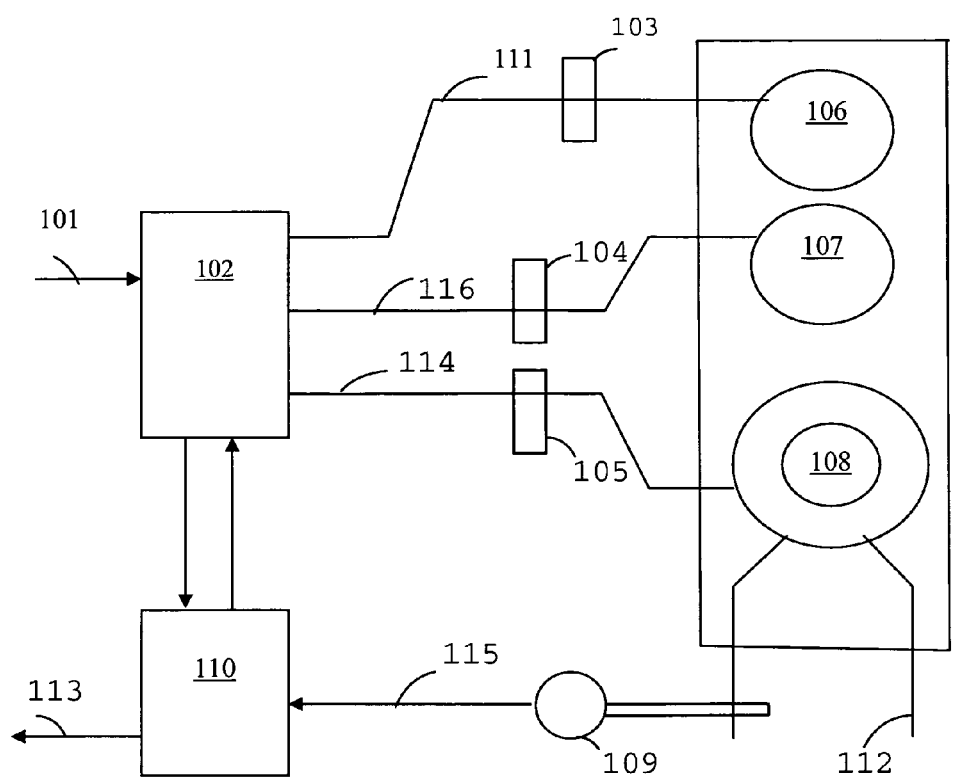
FIG. 1 is a schematic diagram of the system embodying the principles of the invention used for two staged refrigeration systems.

FIG. 1 shown below illustrates an embodiment of an optimizer for use in a two staged refrigeration system. Power for running the optimizer is derived from existing power source 101, which can be either single or three phase depending on the voltage and frequency. Examples of possible voltages and frequencies are 110, 208, and 480 volts at frequencies of 50 and/or 60 Hz. Speed modulation device 102 converts the source power to the frequency required to modulate the speed of first stage compressor 106, second stage compressor 107, and indoor fan 108. Speed modulation device 102 powers compressors 106, 107, and fan 108 by way of power lines 111, 114, and 116.

Existing relays 103, 104, and 105 are interconnected along power lines 111, 114, and 116 between first stage compressor 106, second stage compressor 107, indoor fan 108, and speed modulation device 102. Relays 103, 104, and 105 start and stop indoor fan 108 and compressors 106 and 107 based on the control schedule of the existing refrigeration system. As an option, an existing room thermostat not illustrated in the figure may also be used to start and stop indoor fan 108, first stage compressor 106, and second stage compressor 107 using the control sequence installed in the thermostat or in controller 110. The thermostat may also determine the system mode based on a predetermined room temperature set point. As an example, if the room temperature is higher than the predetermined set point, then indoor fan 108, first stage compressor 106, and second stage compressor 107 will activate.

Controller 110 generates the speed modulation command and relays that command to speed modulation device 102. Supply air temperature signals are received by controller 110 from supply air temperature sensor 109. Temperature sensor 109 can be attached to indoor fan 108 by supply duct work 112 and to controller 110 by way of power line 115. Power related data including (but not limited to) the power factor, output torque, input and output currents, voltages, and frequencies are sent to controller 110 by speed modulation device 102. Controller 110 also records historical data, identifies the system mode, building loads, and system faults, and may be linked to and communicate with upper level controllers. Power line 113 may be used to connect controller 110 to other devices.

Figure 2:
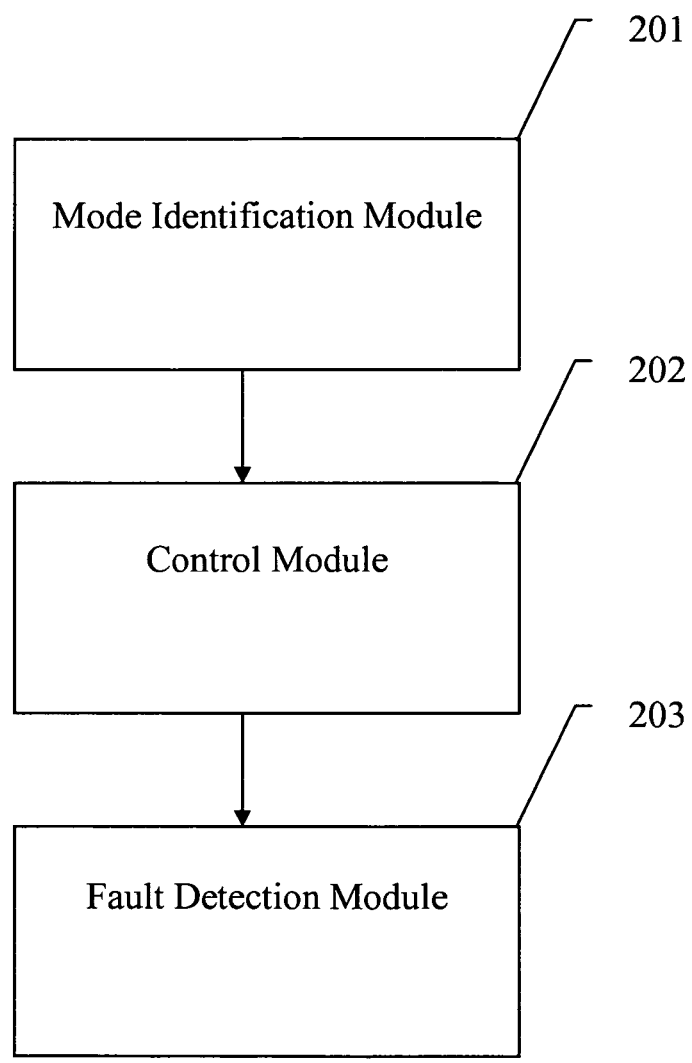
FIG. 2 is a flowchart showing the decision-making processes of the controller of the system embodying the principles of the invention used for two staged refrigeration systems.

FIG. 2 shown below illustrates the decision making processes of controller 110. Controller 110 is comprised of mode identification module 201, control module 202, and fault detection module 203.

Mode identification module 201 indentifies the system operating mode based on the output of speed modulation device 102, current and power values (either the actual current or actual power), and supply air temperature values. The operating mode is comprised of "off", "circulation", "first stage cooling", "second stage cooling", "first stage heating", "second stage heating" or "auxiliary heating" modes of operation. Mode identification module 201 also supplies the supply air temperature values and indicates whether true power or current is in use. Minimum current and power values for indoor fan 108 and compressors 106 and 107 are determined using differing frequencies. The operating mode is determined based on the relationship between the power and/or current values for indoor fan 108, compressors 106 and 107, and the output of speed modulation device 102 as detailed in the following.

In "off" mode, actual current and/or power values are less than the predetermined current and/or power values for indoor fan 108. In "circulation" mode, the actual current and/or power values are closest in value to the current and/or power values of indoor fan 108 as predicted using the current output of speed modulation device 102. At the same time, supply air temperature values must lie within a predetermined range (for example between approximately 67° F. to 83° F.).

In "first stage cooling" mode, the actual current and/or power values are closest to the sum of the power/current values of fan 108 and those of compressor 107. The supply air temperature must also lie below a predetermined value (for example 65° F.).

In "second stage cooling" mode, the actual current and/or power values are closest to the sum of the power/current values of indoor fan 108 and those of first and second stage compressors 106 and 107. The supply air temperature must also be below a predefined value (below approximately 65° F., for example).

In "first stage heating" mode for a heat pump system, the actual current and/or power is closest to the sum of the power/current values for indoor fan 108 and the power/current values of first stage compressor 106. The supply air temperature is also above a predetermined value (for example approximately 85° F.).

In "second stage heating" mode for a heat pump system, the actual current and/or power is closest to the sum of the power/current values of indoor fan 108 and the power/current values of first stage compressor 106 and second stage compressor 107. The supply air temperature must lie above a predefined value (for example approximately 65° F.).

In "auxiliary heating" mode, actual current/power values are closest to the power/current values of indoor fan 108 as predicted by the current speed modulation output. The supply air temperature must be above a predetermined value (for example approximately 90° F.). In this mode, control module 202 modulates speed modulation device 102 at a maximum speed when the optimizer is, applied to a heat pump system. When the optimizer is applied to roof top units, control module 202 modulates speed modulation device 102 to maintain the supply air temperature below a predetermined value. This predetermined value may be a function of the fan speed. If the supply air temperature is higher than the predetermined value, the output speed must be increased. Likewise, if the supply air temperature is lower than the predetermined value, the output speed must be decreased.

Control module 202 determines the speeds of indoor fan 108 and first and second stage compressors 106 and 107 based on the supply air temperature values and system mode. In the "off" mode, the actual fan speed is zero. This is because relay 105 keeps indoor fan 108 inactive regardless of the output of speed modulation device 102.

For both the "first stage cooling" and "first stage heating" modes, control module 202' commands the output of speed modulation device 102 at a minimum compressor speed (for example, at 50% of the maximum output). Relay 104 keeps compressors associated with second stage cooling or heating inactive. Once the system has transitioned from "first stage heating" and "first stage cooling" modes to "second stage heating" and "second stage cooling" modes, control module 202 commands the output of speed modulation device 102 at the minimum compressor speed for a predetermined period of time (approx. 5 min. for example). In other words, control module 202 commands the output of speed modulation device 102 at a minimum compressor speed in the "first stage cooling" mode, the "first stage heating mode", and at the start of the "second stage cooling mode".

The following details the procedure for finding the output of speed modulation device 102. Upon activation of the compressor, the supply air temperature (SAT) may be taken in intervals of approximately a few seconds or shorter. Data is smoothed using a moving average (for example, 10 data can be used). Record the average supply air temperature at the first half time ($T_{sa1}$) as well as the average supply air temperature at the second half (5) time ($T_{sa2}$). The output of speed modulation device 102 may then be determined using the equation:

$$Spd=\min(spdMax, \max(spdMin,(currentSpd-\beta(T_{sa1}-T_{sa2}))))$$

wherein Spd represents the percent speed assigned to speed modulation device 102, currentSpeed represents the speed of speed modulation device 102 at its current rate.

spdMin represents the lowest compressor speed limit.

spdMax represents the highest speed limit of the speed modulation device.

The β-modulation ratio ranges from 1 to 10 (4 is recommended).

Control module 202 modulates speed modulation device 102 to maintain the supply air temperature below a predetermined value. This predetermined value may be a function of the fan speed. If the supply air temperature is higher than the predetermined value, the output speed must be increased. Likewise, if the supply air temperature is lower than the predetermined value, the output speed must be decreased.

The optimizer identifies the compressor and fan faults using patented technologies already claimed in other patents. The programming of control device 110 is not detailed in this disclosure but is known to a person of ordinary skill in the art.

What is claimed is:

1. An optimizer for modulating the speed of an indoor fan and first and second stage compressors of a two-staged refrigeration system including a plurality of relays and an existing power source, said optimizer comprising:

a speed modulation device in proximity to said existing power source and configured to collect power and current values from said existing power source, a supply air temperature sensor linked to said indoor fan and operable to obtain supply air temperature values;

a controller linked in communication with said speed modulation device and supply air temperature sensor and, based on a function of said current and/or power values and a difference between said supply air temperature value at two moments, is operable to generate a system mode and speed command to modulate said speed modulation device, said controller comprising:

a mode identification module configured to assign said system mode in at least one of an off, circulation, first stage cooling, second stage tooting, first stage heating, second stage heating, and auxiliary heating mode based on the output of said speed modulation device, said supply air temperature values, and said true current and power values of said indoor fan and first and second stage compressors; and a control module configured to determine the speed of said indoor fan and said first and second stage compressors based on said supply air temperature values and said system mode.

2. The optimizer of claim 1, wherein said mode identification module is operable to assign said operating mode in an off mode when said true current and/or power values are lower than a predetermined current and power value for said fan.

3. The optimizer of claim 1, wherein said mode identification module is operable to assign said system mode in a circulation mode when said current and/or power values for said fan are closest in value to said true current power values based on the current output of said speed modulation device, and said supply air temperature values lie within a predetermined range.

4. The optimizer of claim 1, wherein said mode identification module is operable to assign said system mode in a first stage cooling mode when said actual current and/or power values are closest in value to the sum of said power and current values of said indoor fan and second stage compressor, and said supply air temperature values are below a predetermined value.

5. The optimizer of claim 1, wherein said mode identification module is operable to assign said operating mode in a second stage cooling mode when said actual current and/or power values are closest in value to the sum of said current and/or power values of said indoor fan and first and second stage compressors, and said supply air temperature values are above a predetermined value.

6. The optimizer of claim 1, wherein said mode identification module is operable to assign said operating mode in a first stage heating mode when said true current and/or power values are closest to the sum of said power and current values of said fan and said first stage compressor.

7. The optimizer of claim 1, wherein said mode identification module is operable to assign said operating mode in a second stage heating mode when said actual current and/or power values are closest in value to the sum of said power and current values of said fan and said first and second stage compressors, and said supply air temperature values lie above a predetermined value.

8. The optimizer of claim 1, wherein said mode identification module is operable to assign said operating mode in an auxiliary heating mode when said actual current and/or power values are closest to said power and current values of said indoor fan based on the output of said speed modulation device.

9. The optimizer of claim 1, wherein said control module is further configured to increase the speed of said speed modulation device when said supply air temperature values are higher than a predetermined temperature value and lowers the speed of said speed modulation device when said supply air temperature values are below a predetermined temperature value in said auxiliary mode.

10. The optimizer of claim 1, wherein said control module commands the output of said speed modulation device at a minimum compressor speed in said first stage cooling mode, said first stage heating mode, and at the start of said second stage cooling mode.

11. The optimizer of claim 1, wherein said control module commands the output of said speed modulation device at a minimum fan speed in said off mode and said circulation mode.

* * * * *